G. S. MacLEOD.
UNIVERSAL BRACKET FOR AUTOMOBILE BUMPERS OR FENDERS.
APPLICATION FILED FEB. 7, 1921.

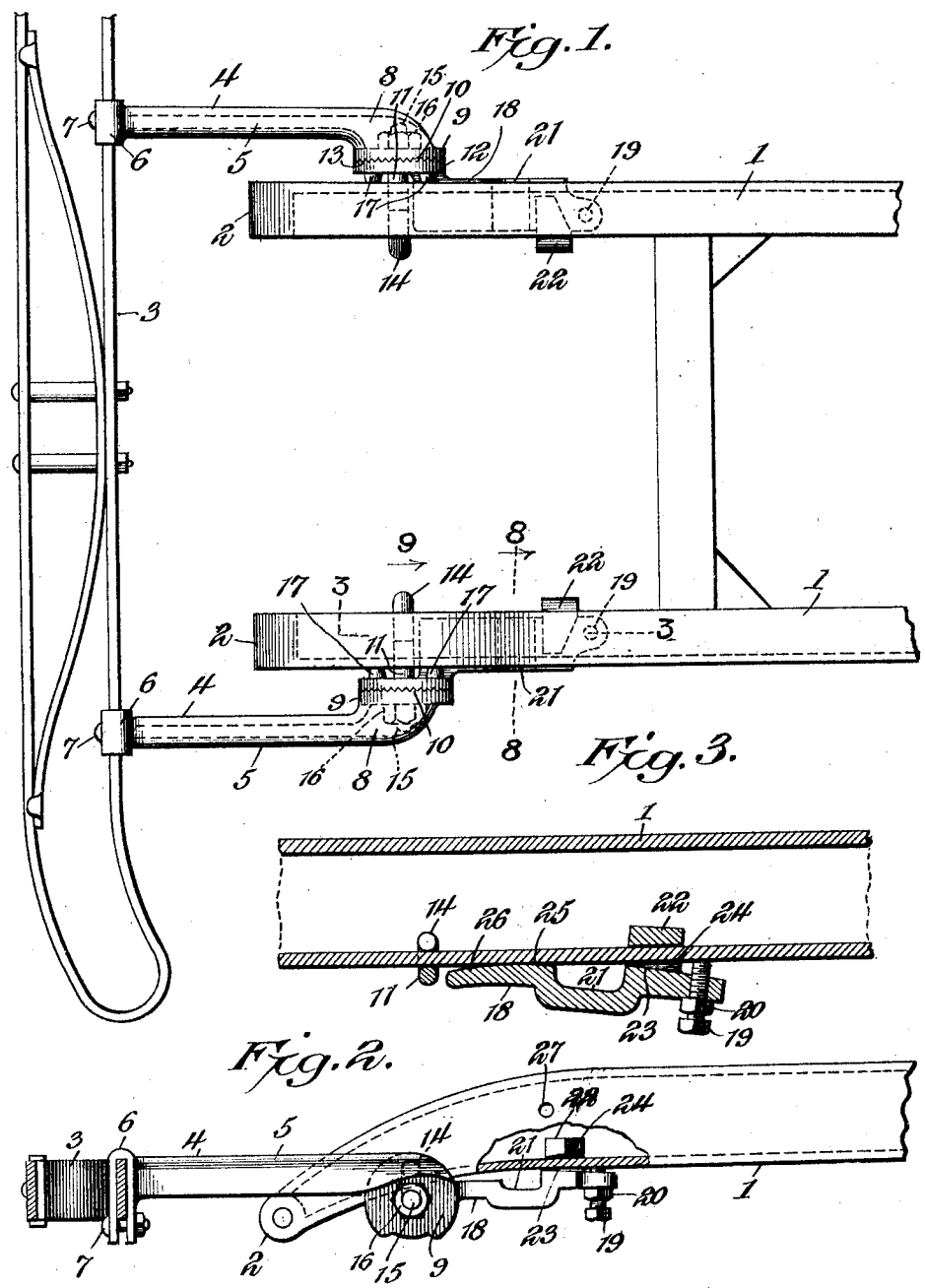
G. S. MacLEOD.
UNIVERSAL BRACKET FOR AUTOMOBILE BUMPERS OR FENDERS.
APPLICATION FILED FEB. 7, 1921.
1,407,431.  Patented Feb. 21, 1922.
2 SHEETS—SHEET 1.

1,407,431. Patented Feb. 21, 1922.
2 SHEETS—SHEET 2.

George S. MacLeod, INVENTOR,

WITNESSES
Howard D. Orr
F. J. Chapman

BY E. G. Siggers
ATTORNEY

UNITED STATES PATENT OFFICE.

GEORGE STEWARD MacLEOD, OF SEATTLE, WASHINGTON, ASSIGNOR OF ONE-HALF TO ANGUS P. MacLEOD, OF SEATTLE, WASHINGTON.

UNIVERSAL BRACKET FOR AUTOMOBILE BUMPERS OR FENDERS.

1,407,431.            Specification of Letters Patent.    Patented Feb. 21, 1922.

Application filed February 7, 1921. Serial No. 443,083.

*To all whom it may concern:*

Be it known that I, GEORGE S. MACLEOD, a citizen of the United States, residing at Seattle, in the county of King and State of Washington, have invented new and useful Improvements in Universal Brackets for Automobile Bumpers or Fenders, of which the following is a specification.

This invention has reference to universal brackets for automobile bumpers or fenders and its object is to provide a bracket by means of which automobile bumpers or fenders may be attached to the automobile chassis to extend to either the front or rear thereof and which are adapted to various types of automobiles without being interfered with by existing parts of the automobile frame or chassis and without interference with certain shock absorbing attachments which are applied to automobiles.

The bracket, one on each side of the automobile, is designed to secure a spring bumper bar to all different makes of automobiles, either forwardly of the front axle or rearwardly of the rear axle and without being interfered with by the front aprons of the chassis frame or requiring any special preparation of the frame of the machine to receive them.

The invention is also designed to overcome certain defects which have especially developed in the application of bumper holder brackets and to avoid the liability of the bumpers tilting and hence loosening and rattling. Moreover, the bumper bracket is designed to accommodate itself to the application of a snubber structure on the automobile and to avoid interference with or by the snubber structure, should such structure be already present on the vehicle before the bumper is applied.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a plan view of a portion of an automobile chassis showing a front bumper plate.

Figure 2 is a side elevation, with some parts in section, of a portion of the structure shown in Figure 1.

Figure 3 is a section on the line 3—3 of Figure 1, but shown on a larger scale.

Figure 4:
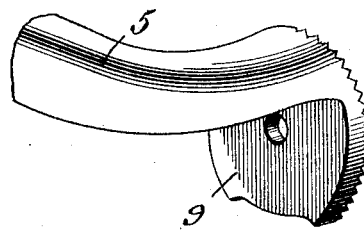
Figure 4 is a perspective view of one end of the bumper bracket.
Figure 5:
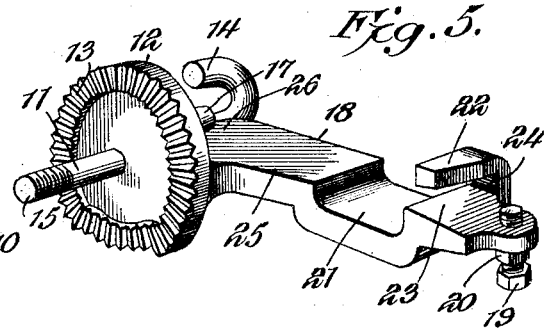
Figure 5 is a perspective view of an anchor member with which the bumper bracket shown in Figure 4 is associated.
Figure 6:
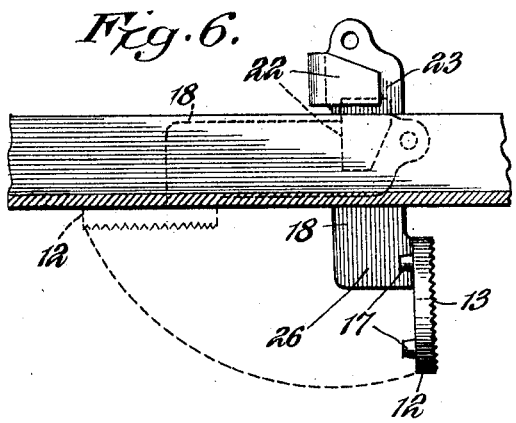
Figure 6 is a horizontal section showing an intermediate position of the anchor plate during its application to the frame of the chassis.
Figure 7:
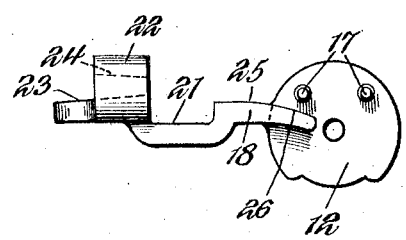
Figure 7 is an elevation of the anchor plate, as seen from the face thereof remote from the center line of the vehicle to which it is applied.

Referring to the drawings, there is shown in Figure 1, side beams 1 of an automobile chassis frame, but omitting many parts having no direct bearing upon the invention. In many automobiles, the side bars 1 are continued forwardly or rearwardly of the front or rear axles and terminate in a drop portion 2, to which the body springs are secured, but as such body springs do not pertain to the invention, they are neither shown nor described. It is, however, to the channels which are continued beyond the axles, that bumpers are attached, with such a bumper of the spring type being shown at 3 in Figures 1 and 2. In order to sustain such bumper, two bumper brackets 4 are provided, and such brackets are identical except that one is a right-hand bracket and the other a left-hand bracket. In order to save repetition and confusion in the description, one only of the bumper brackets and parts associated therewith will be described, but reference numerals will be applied to all parts which are identical except for the right and left hand characteristics.

Each bumper bracket comprises a stem portion 5 terminating at the outer end in a clip 6, into which the bumper 3 is introduced and secured by a bolt 7. At the inner end of the stem 4, the latter is enlarged into a head 8 flattened into a disk-like bearing surface 9, toothed or roughened as indicated at 10, the teeth being arranged in circular series about an axis represented by a bolt 11, about which the teeth are radially arranged.

Associated with the head 9 is another disk-like head 12, with a series of teeth 13 on the face toward the first named head 9 and arranged to match them, so that when the two heads are brought together, the teeth will intermesh, thus locking the heads firmly in adjusted positions. The locking of the heads 9 and 12 together is accomplished by the bolt 11, which at one end is formed into a hook-shaped termination 14 and at the other end is provided with screw-threads 15 for the application of a nut 16, so that the straight portion or shank of the bolt 11 may be introduced through the axis of the two heads 9 and 12, with the hook 14 engaging about one edge of one of the flanges of the channel side bar 1 of the chassis; and the shank is then passed through both of the heads 9 and 12 and beyond the outer face of the head 9 to there receive the nut 16, binding the two heads together in any one of a number of adjusted positions. The face of the head 12 toward the side member 1 of the chassis is provided with spaced lugs 17 to engage against the adjacent face of the upright wall of the channel member 1.

The head 12 is carried by one end of an anchor plate 18, while the other end of the anchor plate is traversed by a set screw 19 having a lock nut 20, permitting the locking of the set screw at any desired position. Intermediately of the length of the anchor plate 18, it is formed with a channel bend 21 and at the set-screw end of the bend, there is formed an overhang lug 22 extending over that edge of the plate 18 remote from the head 12. The lug 22 overhangs a surface 23 on the plate 18 where the overhang lug is located, with the lug 22 and surface 23 related to form a tapered channel 24, adjacent to the channel bend 21. That portion of the anchor plate 18 remote from the surface 23, may be slightly curved or bent, as indicated at 25, so that by means of the set screw 19, the adjacent flange of the channel 1 and the lug 22, together with the surface 25 may be made to accommodate themselves to the flange of the channel 1 whether it be straight or moderately curved.

Figure 8:
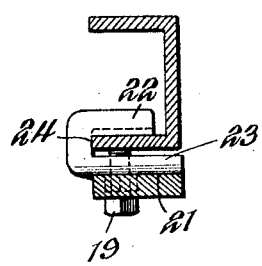
Figure 8 is a section on the line 8—8 of Figure 1, but drawn on a larger scale.
Figure 9:
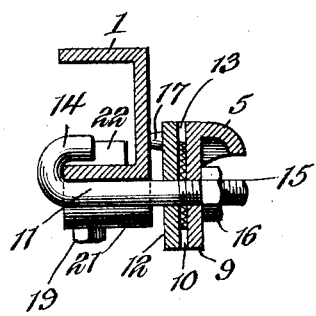
Figure 9 is a section on the line 9—9 of Figure 1, but drawn on a larger scale.

The several parts of the anchor plate 18 are so related to each other that the bearing point of the set screw 19 against the under face of the flange of the channel 1 forces that portion of the plate 18 remote from the set screw up against the bottom of the channel, particularly tight. Moreover, the set screw, as shown in Figure 8, bears on the bottom of the channel at a point near the edge of the latter, leaving the hook end 22 of the anchor plate overlapping the point of the set screw by a considerable distance, say about ⅜ inch from the outer end of the hook, so that the screw 19 is placed far enough back of the bearing side of the hook 22 that the screw 19, when tightened, forces the farther end of the plate 18, indicated at 26, up against the bottom of the channel perfectly tight. This creates a leverage, which counteracts all tendency to tilt the anchor plate, so as to leave a space between the hook and anchor plate and the inner face of the bottom web of the channel 1, such tilting resulting in loosening of the structure and rattling.

The channel 21 is provided for the purpose of accommodating a snubber structure, such for instance, as the Gabriel snubber, which may be applied where the bumper structure hereinbefore described is applied to the chassis, in which case the snubber will extend through the channel 21 and lock in a hole 27 in the channel bar 1, such hole being customarily provided in types of automobiles of which the snubber is made a standard equipment. If the snubber is already installed before the bumper is applied, the channel 21 permits the application of the bumper, without any change whatever in the automobile structure, or without the necessity of dismantling any part of the snubber to apply the bumper, the same being true with respect to the installation of the snubber after the bumper is applied. By the curvature of the engaging surface of the anchor plate, the anchor plate may be secured to the channel, whether the latter be straight or moderately curved.

What is claimed is:—

1. A universal bracket for automobile bumpers or fenders, comprising a stem member, with one end formed to engage and support a bumper and the other end formed into a swivel plate or disk-like head, an anchor plate terminating at one end in a disk-like or swivel plate matching the first named swivel plate, a plate traversing the axes of the two plates with one end formed into a hook to engage over the edge of one flange of the side channel bar of the automobile chassis, said anchor plate having a lug for engaging over the same flange of the channel bar, and a set screw carried by the anchor plate at the end remote from the disk-like head on the anchor plate to force the anchor plate at the end provided with the head against the same flange of the channel plate engaged by the screw.

2. A universal bracket for automobile bumpers or fenders, comprising a stem member, with one end formed to engage and support a bumper and the other end formed into a swivel plate or disk-like head, an anchor plate terminating at one end in a disk-like head or swivel plate matching the first named swivel plate, a bolt traversing the axes of the two plates with one end formed into a hook to engage over the edge of one flange of a channel bar of the chassis, said anchor plate having a lug for engaging over the same flange of the channel bar, and a set screw carried by the anchor plate at the end remote from the disk-like head on the anchor plate to force the anchor plate at the end provided with the head against the same flange of the channel plate engaged by the screw, the face of the anchor plate designed to engage the channel bar having a longitudinal curvature to provide a three-point engagement of the anchor plate with the same face of the channel bar.

3. In a universal bracket for automobile bumpers or fenders, an anchor plate, swivel means for attaching a bumper to the anchor plate, and means for securing the anchor plate to a channel bar of an automobile chassis, including a lug on the anchor plate shaped to overhang and engage the lower flange of the chassis channel bar with the anchor plate underlying the same flange, a set screw traversing one end of the anchor plate for engaging the under face of the flange of the channel bar intermediate of the length of the overhang portion of the lug, whereby to prevent lateral tilting and loosening of the anchor plate, and means for providing a three-point engagement between the channel bar and the anchor plate with its set screw.

4. In a universal bracket for automobile bumpers or fenders, an elongated anchor plate having a lateral channel in that face designed to engage a longitudinal automobile chassis bar and also having a head at one end serving as a swivel head, a set screw traversing the plate at the other end, and an overhang lug on the anchor plate on the face thereof from which the set screw projects.

5. In a universal bracket for automobile bumpers or fenders, an elongated anchor plate having a lateral channel in the face thereof designed to engage a longitudinal automobile chassis bar and also having a head at one end designed to serve as a swivel head, a set screw at the other end of the anchor plate projecting through said anchor plate to engage the chassis bar, an overhang lug on the anchor plate on that face thereof from which the set screw projects, and a hook bolt extending through the swivel head axially thereof with the hook adapted to engage about the lower flange of the longitudinal chassis bar.

6. In a universal bracket for automobile bumpers or fenders, an enlongated anchor plate adapted to bear against the lower flange of an automobile chassis side channel bar with the face engaging the bar curved longitudinally to admit rocking of the plate, a swivel head on one end of the anchor plate, an overhang lug on the other end of the anchor plate, said anchor plate having a plurality of engaging points for the chassis bar, and a set screw carried by the end of the anchor plate remote from the swivel plate with the set screw projecting through the anchor plate toward the chassis bar, and with the set screw located to engage the chassis bar nearer to the end of the anchor plate than is the overhang lug.

7. In a universal bracket for automobile bumpers, a longitudinally extended anchor plate, adapted to underride a longitudinal automobile chassis channel bar, a swivel head at one end of the anchor plate, a set screw carried by and tapped through the anchor plate at the end thereof remote from the swivel head and located to bear against the lower face of the channel bar, with the other end portion of the anchor plate in rockable contact with the lower face of the channel bar, and an overhang lug integral with the anchor plate and adjacent to the set screw and located between the set screw and the end of the anchor plate designed to rockably engage the channel bar.

8. In a universal bracket for automobile bumpers or fenders, an elongated anchor plate shaped at one end for rocking engagement with a longitudinal automobile chassis channel bar, means adjacent to the same end of the anchor plate for supporting a fender or bumper, a set screw traversing the anchor plate near the other end thereof and located to engage the underface of the lower flange of the channel bar, a hook bolt for connecting the anchor plate and fender support together, and lugs on the end of the anchor plate traversed by the hook bolt, whereby to there hold the anchor plate in spaced relation to the upright web of the channel bar.

In testimony that I claim the foregoing as my own I have hereto affixed my signature.

GEORGE STEWARD MacLEOD.